United States Patent Office 3,125,403
Patented Mar. 17, 1964

3,125,403
NEW COLOURATION PROCESS
Norbert G. B. Senger, Manchester, England, assignor to Imperial Chemical Industries Limited, London, England, a corporation of Great Britain
No Drawing. Filed May 29, 1961, Ser. No. 113,103
Claims priority, application Great Britain June 16, 1960
5 Claims. (Cl. 8—65)

This invention relates to a new colouration process. More particularly the invention relates to a process for obtaining multicolour effects on cellulose textile fabrics.

According to the invention, there is provided a process for colouration of cellulose textile fabrics which comprises applying to a portion of one surface of the fabric a thickened printing paste which contains a nitrogenous resin precondensate and a curing agent, thereafter subjecting the fabric to a heat treatment to cure the precondensate and thereafter applying to the same surface of the fabric a water-soluble reactive dyestuff.

By this process, the portion of the fabric which has been treated with the paste is not dyed by the reactive dyestuff, so that an excellent resist effect is obtained.

As examples of nitrogenous resin precondensates which may be used in the above process there may be mentioned the methylol derivatives or lower alkyl ethers of methylol derivatives of monomeric or polymeric compounds containing a plurality of amino or mono substituted amino groups said compounds being known from the art or used in practice for the formation of resins by condensation with formaldehyde. Suitable compounds include, for example, monomeric nitrogen compounds such as urea, thiourea, substitued ureas and thioureas, dicyandiamide, dicyandiamidine, biguanides, amides, carbamates, allophanates and heterocyclic compounds such as aminotriazines, urons, ureins, ureides, imidazolidones, triazones and hydantoins, or mixtures of such compounds, and polymeric nitrogen compounds such as the polymeric amides made by the reaction of dibasic acids with diamines. The lower alkyl ethers of the methylol derivatives of these compounds include for example the methyl, ethyl, propyl and butyl ethers. The amount of aminoplast resin precursor used may be made from about 5% by weight to about 25% or even more by weight of the printing paste. In general, it is preferred that the amount of nitrogenous resin precondensate added should be about 10% by weight of the printing paste.

As examples of curing agents, which may be used in the above process there may be mentioned salts formed from weak bases and mineral acids such as zinc chloride, ammonium sulphate and ammonium chloride, mineral acid salts of organic amines, weak acids, for example organic acids such as oxalic acid and substantially neutral substances which develop acidity on heating or streaming, such as magnesium chloride and ammonium thiocyanate. Extremely good resists are obtained when a compound containing a halogeno-s-triazine radical, particularly a di-chloro-s-triazine radical for example 2-(6'-sulpho - 2' - naphthylamino) - 4:6 - dichloro - s - triazine, 2 - (5' - sulpho - 1' - naphthylamino) - 4:6 - di-chloro-s-triazine or 2-(2'-chloroanilino)-4:6-dichloro-s-triazine, is used as at least a part of the catalyst. The amount of catalyst added may be, for example, from 0.1% to 5% by weight and preferably between 1% and 3% by weight of the printing paste.

As examples of thickening agents used to thicken the printing paste, there may be mentioned, for example, gum tragacanth, gum arabic, or preferably alginates or water-in-oil or oil-in-water emulsion thickenings. There may also be added other additives usual in the preparation of resin-treated fabrics for example lubricants or softening agents such as methylol stearamide.

The textile material is preferably dried, for example, at a temperature between 75° C. and 125° C. and then heated to cure the precondensate. This heating step is advantageously carried out at between 140° C. and 170° C. preferably at 150 to 160° C. for a period of up to 15 minutes, preferably for between 3 minutes and 5 minutes.

The treatment of the fabric with the water-soluble reactive dyestuff may be carried out by methods which follow closely the usual art of applying a water-soluble dyestuff as a ground shade to a single surface of the fabric. The preferred methods are to apply by cover-printing or by the "nip-pad" process, i.e. by passage through a pair of rollers, the lower of which dips in a slightly thickened solution of the dyestuff.

The printing paste or aqueous solution containing the water-soluble reactive dyestuff may contain the usual adjuvants for application of these dyestuffs for example thickening agents, especially alginates or emulsion thickeners which may be of the oil-in-water or water-in-oil type, migration inhibitors such as sodium chloride or sodium sulphate, wetting agents and acid-binding agents such as the alkali metal bicarbonates, carbonates, phosphates and silicates.

The dyestuff may thereafter be fixed on the fabric by subjection to a short heat treatment for example by steaming or heating in dry air or on a heated roller, e.g. for 30 seconds to 15 minutes according to the time required for that particular dyestuff or by allowing the fabric to stand in a moist state at atmospheric temperature for a somewhat longer period of time.

The water-soluble reactive dyestuff after the resist printing may also be advantageously applied by the dyeing processes described and claimed in United States application, Serial No. 773,190 or in the United States applications, Serial Nos. 9,700 and 104,823; that is to say, by treating the whole surface of the textile material, preferably by padding, with an aqueous medium containing a resin-forming composition and an acid catalyst as well as the water-soluble reactive dyestuff, the fabric then being subjected to a second heat treatment to cure the resin. The preferred catalysts are mineral acid salts, especially hydrochlorides, of primary or secondary amines containing a hydroxylated alkyl radical such as N-methylglucamine, di - ($\beta$ - hydroxypropyl)amine and di - ($\beta$ - hydroxyethyl)amine. If desired, to reduce migration problems, it is advantageous also to add a homocyclic aromatic compound which contains both alkyl and sulphonic acid groups, such as triisopropyl naphthalene sulphonic acid or butylated naphthalene sulphonic acid.

As examples of water-soluble reactive dyestuffs which may be used in the process of the invention, there may be mentioned, for example, water-soluble dyestuffs of the anthraquinone, nitro, phthalocyanine and azo series, including mono- and poly-azo and unmetallised and metallised azo dyestuffs for example copper-, nickel-, chromium and cobalt-complex azo dyestuffs. As examples of the reactive group present in these dyestuffs there may be mentioned, for example, mono or di-halogeno-triazine group, the di- or tri-halogeno-pyrimidine group, the $\beta$-sulphatoethyl sulphone group, the $\beta$-halogeno- or $\beta$-sulphato-alkyl sulphamyl group, the $\beta$-alkylsulphonyloxy- or $\beta$-arylsulphonyloxy-alkyl sulphone group, the acryloylamino group, the $\beta$-chloropropionylamino group and heterocyclic radicals containing quaternary ammonium or sulphonic acid groups attached to the carbon atoms of the nucleus.

The process of the invention may also be adapted to give a plurality of colours by adding a reactive dyestuff to the printing paste, as described in United States application Serial No. 773,190.

This process of utilising a reactive dyestuff to give a coloured resist under a reactive dyestuff of different shade as ground shade forms a preferred feature of the invention. Any of the reactive dyestuffs mentioned above may be used to obtain the coloured resist.

The dyestuff used for the ground shade may contain the same or a different reactive system as that used to obtain the coloured resist.

It is preferred to use a dyestuff containing the dichlorotriazine group since these in general, give the best fixation at the preferred operating temperatures of 150° C. to 160° C. Improved yields from dyestuffs containing other reactive groups may be obtained by curing the dyestuff/nitrogenous resin condensate mixture at a higher temperature, but above 170° C. there is considerable difficulty in preventing thermal damage to the cellulose.

The preferred nitrogeneous resin condensates for use in the preparation of the coloured resist are those based on 4,5-dihydroxy-1,3-dimethylol-2-imidazolidone and tetramethylol acetylene bis urea since in general they give colourations having the highest light fastness.

By the process of the invention it is possible to obtain resist-coloured cellulose fabrics having a wide range of ground shades by very simple techniques; the fabrics so obtained are distinguished by the wide range of brilliant colours which are available by this process for both the printed colours and the ground shades, by the high wash fastness which by this process is similar for all the coloured areas of the fabric and by a very sharp mark of the prints.

The invention is illustrated, but not limited by the following examples in which parts and percentages are by weight.

*Example 1*

A resist paste containing—

| | Parts |
|---|---|
| Water | 505 |
| 4,5-dihydroxy-1,3-dimethylol-2-imidazolidone | 100 |
| Sodium alginate (4% solution) | 350 |
| Titanium dioxide | 25 |
| Diethanolamine hydrochloride | 8 |
| Ammonium nitrate | 2 |
| Methylol stearamide | 10 | is printed in a striped design on mercerised sateen. The fabric is then dried at 70° C. and baked for 5 minutes at 155° C. It is then nip-padded in a padding liquor containing—

| | Parts |
|---|---|
| Water | 760 |
| The dyestuff of Example 1 of U.K. Patent No. 785,120 | 20 |
| Urea | 100 |
| Sodium alginate (4% solution) | 100 |
| Sodium m-nitrobenzene sulphonate | 10 |
| Sodium bicarbonate | 10 |

The cloth is dried at 70° C. and the dyestuff fixed by heating the dried cloth on a steam-heated drum for 2½ minutes at 105° C. The print is soaped at the boil for 5 minutes in a solution containing 0.3% of a detergent and 0.05% of sodium carbonate.

The fabric is coloured an orange shade having well-defined white areas where the resist paste was applied.

*Example 2*

A resist paste containing—

| | Parts |
|---|---|
| Water | 455 |
| 4,5-dihydroxy-1,3-dimethylol-2-imidazolidone | 100 |
| Sodium alginate (4% solution) | 350 |
| Titanium dioxide | 25 |
| Diethanolamine hydrochloride | 8 |
| Ammonium chloride | 2 |
| Methylol stearamide | 10 |
| 2-(5'-sulpho-1'-naphthylamino) - 4:6 - dichloro-s-triazine | 50 | is printed on unmercerised cotton. The fabric is then dried at 70° C. and baked for 5 minutes at 155° C.

It is then nip-padded in a padding liquor containing—

| | Parts |
|---|---|
| Water | 765 |
| The dyestuff of Example 7 of U.K. Patent No. 826,689 | 10 |
| Urea | 100 |
| Sodium alginate (4% solution) | 100 |
| Sodium m-nitrobenzene sulphonate | 10 |
| Sodium bicarbonate | 15 |

The cloth is dried at 70° C. and the dyestuff fixed by steaming for 6 minutes. The print is soaped as described in Example 1.

The fabric is coloured a turquoise blue shade having white areas where the print paste was applied.

A similar result is obtained if the 4,5-dihydroxy-1,3-dimethylol-2-imidazolidone is replaced by any of the following nitrogenous resin precondensates:

Tetramethylol acetylene diurea,
N,N'-dimethylol butane-1,4-diol diurethane,
Dimethylol melamine,
Hexamethylol melamine,
1,3-dimethylol-2-imidazolidone, and
1,3-dimethyl-5-hydroxyethyl-2-triazone.

If the padding liquor is replaced by one containing—

| | Parts |
|---|---|
| Water | 820 |
| The disulphate ester of 3-methyl-1-(4'-β-hydroxyethylsulphamylphenyl)-4-(4''-methyl-3''-β - hydroxyethyl-sulphamylphenylazo)-5-pyrazolone | 10 |
| Urea | 50 |
| Sodium alginate | 100 |
| Sodium m-nitrobenzene sulphonate | 10 |
| Sodium hydroxide (40% solution) | 10 | and the fabric is dried, steamed for 6 minutes and soaped, the fabric is coloured yellow with white areas where the resist paste was applied.

*Example 3*

A printing paste containing—

| | Parts |
|---|---|
| Water | 500 |
| The dyestuff of Example 1 of U.K. Patent No. 785,222 | 30 |
| 4,5-dihydroxy-1,3-dimethylol-2-imidazolidone | 100 |
| Sodium alginate (4% solution) | 350 |
| Ammonium thiocyanate | 10 |
| Methylol stearamide | 10 | is printed on mercerised cotton sateen. The fabric is then dried and baked for 5 minutes at 155° C. It is then nip-padded in a padding liquor containing—

| | Parts |
|---|---|
| Water | 750 |
| The dyestuff obtained as described below | 25 |
| Urea | 100 |
| Sodium m-nitrobenzene sulphonate | 10 |
| Sodium bicarbonate | 15 |

The print is dried at 70° C. and steamed for 6 minutes. The print is finally soaped as described in Example 1.

The fabric is coloured a dark blue shade having red areas where the print paste was applied.

The dyestuff used in the above example may be obtained by condensing one molecular proportion of 2,4-dichloro-6-(3'-sulphoanilino)-s-triazine with 1 - amino-4-(3'-aminoanilino)anthraquinone-2,4'-disulphonic acid.

Example 4

A resist paste containing—

| | Parts |
|---|---|
| Water | 470 |
| The dyestuff of Example 1 of U.K. Patent No. 785,222 | 5 |
| 4,5-dihydroxy-1,3-dimethylol-2-imidazolidone | 100 |
| Sodium alginate (4% solution) | 350 |
| 2,4 - dichloro-6-(5'-sulpho-1' - naphthylamino)-s-triazine | 55 |
| Diethanolamine hydrochloride | 8 |
| Ammonium chloride | 2 |
| Methylol stearamide | 10 | is printed on cotton. The fabric is then dried at 70° C. and baked for 5 minutes at 155° C. It is then nip-padded through a padding liquor containing—

| | Parts |
|---|---|
| Water | 725 |
| The dyestuff described below | 40 |
| Urea | 100 |
| Sodium alginate (4% solution) | 100 |
| Sodium m-nitrobenzene sulphonate | 10 |
| Sodium bicarbonate | 25 | the fabric is then dried at 70° C. steamed for 6 minutes and then soaped as described in Example 1.

The fabric is coloured a black shade having pale red areas where the resist paste was applied.

The dyestuff used in the padding liquor may be obtained by condensing 2 molecular proportions of 2,4-dichloro-6-amino-s-triazine with the 1:2-chromium complex of 1,2'-dihydroxy-6-amino-6'-nitro-2:1'-azo naphthalene-3,4'-disulphonic acid.

Example 5

A resist paste containing—

| | Parts |
|---|---|
| Water | 500 |
| The sulphate ester of 1-amino-4-(3'-β-hydroxyethylsulphonylanilino)anthraquinone-2-sulphonic acid | 30 |
| Sodium alginate (4% solution) | 350 |
| 4,5-dihydroxy-1,3-dimethylol-2-imidazolidone | 100 |
| Diethanolamine hydrochloride | 8 |
| Ammonium chloride | 2 |
| Methylol stearamide | 10 | is printed on mercerised cotton. The fabric is dried at 70° C. and is then baked for 5 minutes at 170° C. It is then nip-padded in a solution containing—

| | Parts |
|---|---|
| Water | 765 |
| The dyestuff of Example 1 of U.K. Patent No. 785,222 | 10 |
| Urea | 100 |
| Sodium alginate (4% solution) | 100 |
| Sodium m-nitrobenzene sulphonate | 10 |
| Sodium bicarbonate | 15 | then dried and the dyestuff is fixed by contacting the fabric for a period of 2½ minutes with the surface of a cylinder heated at 105° C. The fabric is then soaped as described in Example 1.

The fabric is coloured a red shade with dark blue areas where the resist paste was applied.

Example 6

A resist paste containing—

| | Parts |
|---|---|
| Water | 470 |
| The dyestuff of Example 1 of U.K. Patent No. 785,222 | 5 |
| 4,5-dihydroxy-1,3-dimethylol-2-imidazolidone | 100 |
| Sodium alginate (4% solution) | 350 |
| 2,4 - dichloro-6-(5'-sulpho-1' - naphthylamino)-s-triazine | 55 |
| Diethanolamine hydrochloride | 8 |
| Ammonium chloride | 2 |
| Methylol stearamide | 10 | is printed on cotton. The fabric is then dried at 70° C. and baked for 5 minutes at 155° C. It is then nip-padded, dried, steamed and soaped as described in Example 3.

The fabric is coloured a dark blue shade with red areas where the print paste was added. A similar effect is obtained if the 4,5-dihydroxy-1,3-dimethylol-2-imidazolidone is replaced by any of the following nitrogenous resin precondensates—

Tetramethylol acetylene diurea,
N,N'-dimethylol butane-1,4-diol diurethane,
Dimethylol melamine,
Examethylol melamine,
1,3-dimethylol-2-imidazolidone, and
1,3-dimethylol-5-hydroxyethyl-2-triazone.

Example 7

A mercerised cotton fabric is roller printed with a white resist paste of the following composition:

| | Parts |
|---|---|
| Dihydrogen ammonium phosphate | 10 |
| 4:4' - bis - [2" - chloro - 4" - hydroxyethylamino-6" - s - triazinylamino]stilbene - 2:2' - disulphonic acid | 2 |
| Water | 398 |
| Sodium alginate (10% aqueous solution) | 400 |
| 4,5 - dihydroxy - 1,3 - dimethylol - 2 - imidazolidone | 100 |
| Sodium m-nitrobenzene sulphone | 10 |
| N-methylol stearamide (50% aqueous solution) | 30 |
| Titanium dioxide | 50 |

The printed fabric is dried at 70° C. and then baked for 3 minutes at 155° C. It is then nip-padded through a padding liquor containing—

| | Parts |
|---|---|
| Water | 730 |
| Example 2 of United Kingdom specification No. 850,559 | 20 |
| Sodium alginate (4% aqueous solution) | 100 |
| Sodium m-nitrobenzene sulphonate | 10 |
| 4,5 - dihydroxy - 1,3 - dimethyol - 2 - imidazolidone | 100 |
| N-methylol-stearamide (50% aqueous solution) | 20 |
| Diethanolamine hydrochloride | 12 |
| Ammonium nitrate | 8 |

The fabric is dried at 70° C., baked for 3 minutes at 155° C. then soaped at the boil for 5 minutes in a solution containing 0.2% of a detergent and 0.2% of sodium carbonate.

The fabric is coloured a purple shade having well-defined white areas where the resist paste was applied.

Example 8

A mercerised cotton fabric is screen printed in succession with printing pastes containing the dyestuffs described in Example 1 of United Kingdom specification No. 785,222 and Example 2 of United Kingdom specification No. 785,120 respectively, the printing pastes having the following composition:

| | Parts |
|---|---|
| Dyestuff | 30 |
| Water | 480 |
| 4,5 - dihydroxy - 1,3 - dimethylol - 2 - imidazolidone | 100 |
| Sodium alginate (4% aqueous solution) | 350 |
| N-methylol-stearamide (50% aqueous solution) | 20 |
| Diethanolamine hydrochloride | 12 |
| Ammonium nitrate | 8 |

The printed fabric is dried at 70° C. and then baked for 3 minutes at 155° C. It is then nip-padded in a solution identical with that of Example 7 except that the dyestuff is replaced by that described in Example 4 of specification No. 826,405. The fabric is dried, baked and soaped as described in Example 7. The print shows a design of red and orange on a bright yellow background.

What we claim is:

1. Process for colouration of cellulose textile fabrics which comprises applying to a portion of one surface of the fabric a thickened printing paste which contains a nitrogenous resin precondensate selected from the class consisting of methylol derivatives of imidazolidones, methylol derivatives of triazones, methylol derivatives of melamine and methylol derivatives of acetylene diurea and a curing agent for said precondensate, thereafter subjecting the fabric to a heat treatment to cure the precondensate and thereafter applying to the same surface of the fabric a water-soluble reactive dyestuff.

2. Process according to claim 1 wherein there is used, as at least a part of the curing agent, a compound containing the dichloro-s-triazine radical.

3. Process according to claim 1 wherein the amount of curing agent used is between 1% and 3% of the printing paste.

4. Process according to claim 1 wherein a reactive dyestuff is added to the printing paste.

5. Process according to claim 4 wherein said reactive dyestuff contains the dichloro-s-triazine radical.

References Cited in the file of this patent

UNITED STATES PATENTS

| 2,103,587 | Lantz et al. | Dec. 28, 1937 |
| 2,895,785 | Alsberg et al. | July 21, 1959 |

FOREIGN PATENTS

| 785,120 | Great Britain | Oct. 23, 1957 |
| 785,222 | Great Britain | Oct. 23, 1957 |
| 826,405 | Great Britain | Jan. 6, 1960 |
| 826,689 | Great Britain | Jan. 20, 1960 |

OTHER REFERENCES

Derwent: Belgian Patent Report, No. 54A, p. C6, June 30, 1959, Belgian Patent No. 573,126.